Aug. 15, 1967 L. W. SPIRO 3,335,492
SELF-CENTERING SPRING BIASED TUBE CUTTER
Filed Sept. 20, 1965
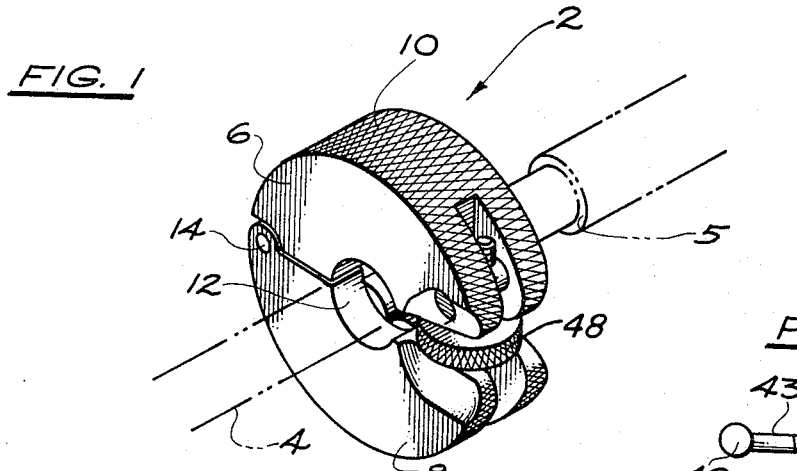
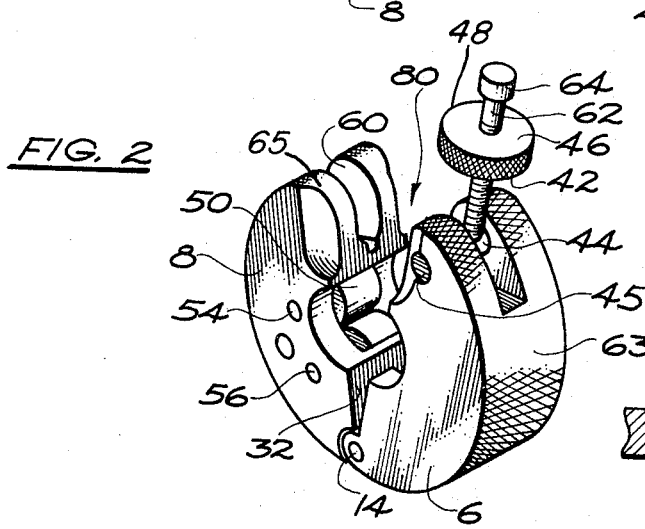
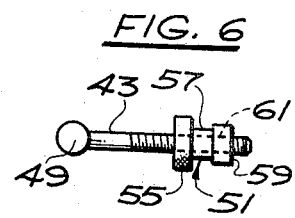
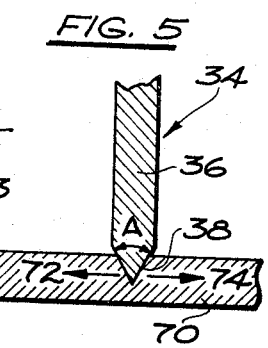
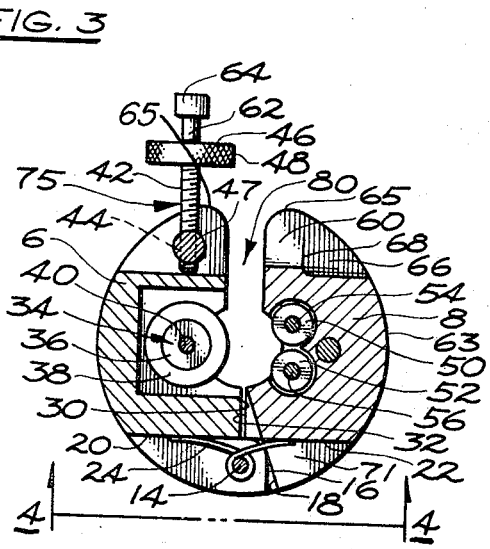
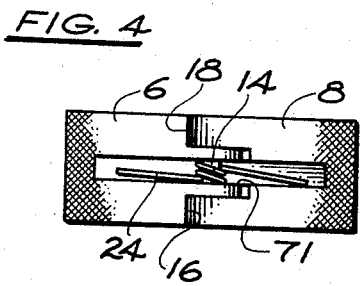
INVENTOR
LLOYD W. SPIRO
BY Donald W. Draver
ATTORNEY United States Patent Office 3,335,492
Patented Aug. 15, 1967

3,335,492
SELF-CENTERING SPRING BIASED
TUBE CUTTER
Lloyd W. Spiro, Canoga Park, Calif., assignor to
North American Aviation, Inc.
Filed Sept. 20, 1965, Ser. No. 488,484
2 Claims. (Cl. 30—101)

ABSTRACT OF THE DISCLOSURE

A ring shaped tube cutter having a pair of pivotally connected arcuate sections that encircle the tube. The sections are spring biased toward one another so as to cooperate with a cutting wheel and rollers to center the tube. An adjustable locking component tightens the arcuate sections to increase cutting pressure.

---

This invention relates to tube cutters.

More particularly, this invention relates to a tube cutter which is hand operated and which occupies minimum space and is therefore particularly useful in locations where space is at a premium.

There are many types of tube cutters known in the art. Typically, these tube cutters are employed for cutting thin walled conduits and include rollers, a cutting wheel and a handle for turning the cutter. Many of the cutters rely on a spring for providing a bias to force the cutter into the conduit. Other cutters employ adjustable screw means to force the cutter wheel into engagement with the tube and as the wheel penetrates the tube, an adjustment is made to retain the cutting force.

An example of a prior art structure is shown in U.S. Patent No. 1,945,949. This type of cutter features an adjustable mechanism for both accommodating different size tubes and to accommodate the wall thickness of a given tube as various depth of the cut is attained. However, the cutter occupies a relatively large space, requiring a turning radius 10–15 times the tube radius.

A tube cutter which occupies a relatively small radial space is shown in U.S. Patent No. 2,622,323. While this cutter is adjustable, the adjustment takes place by protruding members at the sides of the cutter to move the wheels and/or rollers in or out. Thus, protruding parts exist in the axial direction.

Other prior art examples known fail to satisfy the requirements of occupying a minimum space, which can be operated without a handle, and which is in addition adjustable.

This invention obviates the problems of the prior art by providing a tube cutter which is easily placed over the tube, is self centering, adjustable and turnable by hand.

An object of this invention is to provide an improved tube cutter.

Briefly described the instant invention comprehends a ring-shaped self centering tube cutter having a pair of arcuate sections designed to surround a tube that is to be cut. Adjacent interior wall portions of the arcuate sections are mounted a cutting wheel and rollers which when the tube is inserted in position support and center the tube. The arcuate sections are pivotally connected together at a pair of their ends, their opposite ends being adjacent one another so as to define an access opening through which the tube can be inserted into position. Connected to the arcuate sections near the point where they are pivoted together is a spring which constantly biases the sections toward one another. The resulting biasing force causes the cutting wheel and rollers to exert a slight pressure against the tube for automatically centering the tube. The tube is inserted with a snap-action. Pivotally connected to one arcuate section is a locking element designed to be inserted into a mating locking groove formed in the other arcuate section. The locking element is formed with an enlarged head of greater dimensions than the width of the locking groove. The arcuate sections are tightened to increase cutting pressure by rotating an adjusting nut fixed to the locking element. Rotation pulls the enlarged head against a wall portion of the locking groove and thereby draws the arcuate sections closer together. The components of the cutter are packaged wholly within space defined by the outer periphery of the cutter.

Other objects and advantages of this invention will become apparent as this description proceeds taken in conjunction with the drawings in which:

FIG. 1 is a perspective view of the tube cutter according to this invention as shown in cutting position about a tube, FIG. 2 is a perspective view of the tube cutter in open position, FIG. 3 is a view partially in cross-section of the tube cutter, FIG. 4 is a view of a portion of the tube cutter as viewed along line 4—4 of FIG. 3, FIG. 5 is a view of the cutter as it penetrates the tube, and FIG. 6 is a view showing a modification of the locking or closure member.

Referring to FIG. 1, a substantially ring-shaped or circular member or tube cutter 2 is shown as it encircles a pipe 4. Tube sleeve 5 acts as a coupling member to couple tube 4 to a similar tube by welding or the like. Tube cutter 2 has substantially semi-circular elements or halves 6 and 8 each of which has a knurled surface 10 on the outside periphery for hand grasping. An opening 12 is provided for insertion of tube 4. Each of the halves 6 and 8 are spring pivoted toward each other about pivot pin 14. As seen in FIG. 3, tube cutter half 6 has a shoulder portion 16 and tube cutter half 8 has a corresponding shoulder 18. These shoulders are provided so as to prevent excessive opening or separation of tube cutter halves 6 and 8.

Tube cutter half 6 has a shoulder 20 with a corresponding shoulder 22 on tube cutter half 8. These are provided so that spring 24, which is held in place by pivot 14, will exert a force or bias on each of the shoulders 20 and 22 so as to move cutter halves 6 and 8 toward a closed position against shoulders 30 and 32 as shown in FIG. 3. Further closing movement is precluded by stops or shoulders 30 and 32 on sections 6 and 8 respectively.

Tube cutter half 6 has mounted therein a cutter wheel 34 which includes a disc portion 36 and a cutting portion 38. Cutter wheel 34 is held in place by pin 40 with wheel 34 being allowed to rotate thereon. A holding member 75 including a barrel nut 44 is pivoted by means of pin 45 (FIG. 2) which is placed in apertures in tube cutter half 6 so as to rotate from a position shown in FIG. 2 (open) to a closed position as shown in FIG. 1 wherein it acts as a locking member. Barrel nut 44 has an internal threaded portion 47 so that longitudinal bolt member 42 which has complementary threads can be screwed in or out of the barrel nut 44. Integrally mounted on bolt 42 is a nut member 46 having a knurled peripheral surface 48 for ease of turning. Also integral with bolt 42 is a shank member 62 having an enlarged head or stop member 64 integrally attached thereto.

On tube cutter half 8, there is mounted rollers 50 and 52 which are mounted on pins 54 and 56 respectively for rotation thereon. These rollers are mounted opposite cutter wheel 34 so as to apply a force on the inserted tube toward cutter wheel 34. These rollers also act as a support and little friction is encountered between the tube and the rollers. In addition, the rollers align the cutter on tube 4 so that wheel 34 will cut normal to the longitudinal axis of tube 4.

A groove 60 is formed in cutter half 8 which allows shank member 62 to be inserted. This groove has a width just slightly larger than the diameter of the shank member 62. An enlarged groove is provided at 66 to accommodate head or stop member 64. A shoulder 68 formed between grooves 60 and 66 engages stop member 64 to prevent tube cutter halves 6 and 8 from separating. Cutter halves 6 and 8 are spaced to define a groove 80 into which the tube to be cut is inserted with a snap-action. To economize on space the components of cutter 2 are packaged entirely within the outer periphery 63 of the cutter 2.

Tube cutter half 8 (and cutter half 6) have rounded portions 65. This performs an important function in allowing nut member 46 to pivot from the position shown in FIG. 3 to that shown in FIG. 1. Nut member 46, regardless of its position relative to barrel nut 44, will strike rounded surface 65 and smoothly glide thereover forcing tube cutter halves 6 and 8 slightly apart and allowing shank portion 62 to rotate to the bottom of groove 60 and stop member 64 to engage shoulder 68.

FIG. 4 illustrates a detail of the hinged portion of the tube cutter halves 6 and 8. To insure greater rigidity, a dovetail effect is provided with spring member 24 located in appropriate groove 71.

FIG. 5 illustrates another feature of this invention. There are many applications where it is desirable not to have debris left after cutting such as in the aerospace industry where contaminants in the line may prove destructive. In such a case, a cutter must be employed to make a clean cut in the tube wall without leaving debris. The instant chipless cutter accomplishes this in part by employing a relatively steep angled cutter which is illustrated in FIG. 5 by angle A. It has been found that an angle of approximately 20 degrees is optimum although the angle may vary from 15 to 45 degrees. Within this range of angles, as the cutter progresses through wall 70, a thrust or force is applied to the tube wall in the direction of arrows 72 and 74. As the cutter nears the end of its cutting or severing action toward the interior 76 of wall 70, the final separation of the wall occurs through tension rather than a piercing action thus obviating the formation of debris.

Cutter 34 and rollers 50 and 52 are held in place by their respective pins which are press fit into the tube cutter halves. Tube cutter 34 has a high micro finish such as a No. 2 with a cutting edge radius of 0.001″ plus 0.001″, minus 0.000″. These cutting edge dimensions are given for illustrative purposes only and are not considered to limit other dimensions.

Rollers 50 and 52 project into aperture 12 a slight distance as shown in FIGS. 2 and 3 so that a tube with a sleeve thereon can be inserted with rollers 50 and 52 adapted to abut against the edge of the sleeve. This is desirable when a tube must be cut as close as possible to the sleeve.

FIG. 6 illustrates another embodiment of this invention. Instead of a barrel nut as shown in FIG. 3, a pivoted member 49 is provided which is integral with a longitudinal bolt member 43. A nut 51 having a knurled portion 55, shank 57, stop member 59 and internal threaded portion 61 is threaded over longitudinal bolt member 43.

In operation, cutter 2 is assembled over the conduit by a snap action through groove 80 with longitudinal member 42 in unlocked or open position. The tube will enter through opening 80 formed between halves 6 and 8 and since the tube is of larger diameter than the width of space 80, halves 6 and 8 will be moved apart against the bias of spring 24. The device is self-centering in that, in the cutting position, the tube cutter will be supported by rollers 50 and 52 and bear against cutter wheel 34 normal to the axis of the tube. Member 42 is then pivoted about pivot pin 44 until it lies in groove 60 with head member 64 placed in groove 66 to bear against shoulder 68. Nut 46 which is finely threaded for mechanical advantage is then rotated so as to screw it into barrel nut 44 against shoulder 68 and thus effectuate a closing action of halves 6 and 8. The strength of the workman's fingers will dictate this amount of closing force but will in any event act as a limit to prevent damage to the tube which may occur if too great a force is applied. This damage may take the effect of distortion or bending of the tube. The cutter is then grasped by the hand or fingers on knurled surface 10 and turned one, or if desirable, more than one revolution. After one revolution (or more), knurled nut 46 is then turned again so as to bring cutter wheel 34 into a new cutting position radially inward of the preceding position. When the sections of the tube are separated after repeated revolutions of the device dictated by the material used and the thickness of the tube workpiece, knurled nut 46 is backed off slightly and moved to the position shown in FIG. 3 and the device removed from the tube ends.

With this device, all of the operating portions including the biasing means, the adjusting means and the means for effectuating movement of the cutter about the tube are all located within a minimum space which is within the outer periphery 63 of the cutter. In actual devices constructed according to this invention, the diameter of tube cutter 2 is one inch greater than the diameter of the tube to be cut. This diameter increase of one inch remains substantially constant regardless of tube size. Thus, for a tube of one-half inch, the cutter would have a diameter of one and one-half inches.

While the locking member is shown as two threaded members with a knurled portion for hand turning, it is within the scope of this invention to employ other means. Thus, stop member 64 could have a slot on the end thereof for turning by a screwdriver or could be shaped so as to receive various types of wrenches such as a socket or Allen wrench.

The holding member or assembly 75 has several functions. It serves to pull cutter halves 6 and 8 together and to hold them in a predetermined position and also applies the biasing force necessary to cut the tube. Another advantage resides in the enlarged portions fitting within groove 68 so as to be within the outer periphery of cutter 2.

Thus, it can be seen that by this invention a device is provided which can be operated in minimum spaces. It is provided with all operating portions within the minimum outer periphery.

Having described this invention, it is to be understood that it is to be limited only by the scope of the claims appended hereto.

I claim:
1. A tube cutter comprising:
   a pair of arcuate sections pivotally connected to one another at one pair of their ends, their other pair of ends being adjacent one another so as to define an opening for insertion of a tube to be cut,
   a cutter mounted on one arcuate section,
   rollers mounted on the other arcuate section, the cutter and rollers being positioned to support the tube, and
   a spring connected to the arcuate sections at their pivotally connected ends for biasing them toward one another, the biasing force causing the cutter and rollers to engage and center the tube, and
   a locking and adjusting means pivotally connected to one of said arcuate sections at said other pair of ends including means in the other arcuate section at said other pair of ends for inserting said locking and adjusting means therein so as to bring said cutter and rollers into cutting contact with a tube to be cut, said locking and adjusting means being within the outer periphery of said arcuate sections.

2. The invention as set forth in claim 1 in which said locking and adjusting means comprises:
   a pin formed with a threaded aperture pivotally connected to one arcuate section,
   a locking element including an externally threaded bolt rotatably connected at one of its ends to the pin and an enlarged head fixed to the opposite end of the bolt, and
   an adjusting nut fixed between said pin end and enlarged head to the locking element and situated between said other ends of the arcuate sections for tightening the arcuate sections by moving the enlarged head closer to the pivot pin,
   said means in the other arcuate section defining a locking groove into which the bolt can be inserted, the groove being narrower than the width of the enlarged head.

References Cited

UNITED STATES PATENTS

| | | |
|---|---|---|
| 241,534 | 5/1881 | Glazier _____ 29—560.1 |
| 862,278 | 8/1907 | Nye _____ 30—101 |
| 2,025,105 | 12/1935 | Hillberg _____ 30—101 |
| 2,300,139 | 10/1942 | Stein _____ 30—101 |
| 2,448,578 | 9/1948 | Condon _____ 30—95 |
| 2,622,323 | 12/1952 | Grimaldi _____ 30—101 |
| 2,735,175 | 2/1956 | Tallman _____ 30—102 X |
| 3,163,932 | 1/1965 | Adams _____ 30—101 |

FOREIGN PATENTS 24,695  12/1901  Great Britain.

WILLIAM FELDMAN, *Primary Examiner.*

MYRON C. KRUSE, *Examiner.*